United States Patent
Burkhardt et al.

(10) Patent No.: US 10,958,363 B2
(45) Date of Patent: Mar. 23, 2021

(54) ANTENNA ARRANGEMENT AND KITCHEN APPARATUS

(71) Applicant: Electrolux Appliances Aktiebolag, Stockholm (SE)

(72) Inventors: Jennifer Burkhardt, Rothenburg ob der Tauber (DE); Bianca Puchinger, Rothenburg ob der Tauber (DE); Juan Pablo Rodriguez Cepeda, Rothenburg ob der Tauber (DE); Omar Houbloss, Plouzané (FR)

(73) Assignee: Electrolux Appliances Aktiebolag, Stockholm (SE)

( * ) Notice: Subject to any disclaimer, the term of this patent is extended or adjusted under 35 U.S.C. 154(b) by 325 days.

(21) Appl. No.: 15/029,342

(22) PCT Filed: Dec. 4, 2014

(86) PCT No.: PCT/EP2014/076507
§ 371 (c)(1),
(2) Date: Apr. 14, 2016

(87) PCT Pub. No.: WO2015/086420
PCT Pub. Date: Jun. 18, 2015

(65) Prior Publication Data
US 2016/0268671 A1  Sep. 15, 2016

(30) Foreign Application Priority Data
Dec. 12, 2013  (EP) ...................................... 13196787

(51) Int. Cl.
*H01Q 1/38* (2006.01)
*H01Q 9/04* (2006.01)
(Continued)

(52) U.S. Cl.
CPC ............... *H04B 17/23* (2015.01); *F24C 7/08* (2013.01); *G01K 1/024* (2013.01); *H01Q 1/007* (2013.01);
(Continued)

(58) Field of Classification Search
CPC ........ H01Q 1/007; H01Q 1/22; H01Q 9/0421; H01Q 9/045; H01Q 1/24; H01Q 1/12; H01Q 1/38
See application file for complete search history.

(56) References Cited

U.S. PATENT DOCUMENTS 5,294,938 A * 3/1994 Matsuo ................ H01Q 1/3275
343/829
5,734,350 A * 3/1998 Deming .................. H01Q 1/42
343/700 MS
(Continued)

FOREIGN PATENT DOCUMENTS

| CN | 1343026 | 4/2002 |
| CN | 2502417 | 7/2002 |

(Continued)

OTHER PUBLICATIONS

International Search Report issued in PCT/EP2014/076507 dated Mar. 25, 2015, 3 pages.
(Continued)

*Primary Examiner* — Tho G Phan
(74) *Attorney, Agent, or Firm* — Pearne & Gordon LLP

(57) ABSTRACT

An easy-to-manufacture wide-band antenna arrangement and a kitchen appliance including this antenna arrangement are provided. A resonating part of the antenna arrangement has a flat shape, its outer edges have an elliptical curvature and a coaxial cable is located at a feed in a slit in the middle of the resonating plate. The resonating plate is parallel to a ground plane, and together those parts form a planar
(Continued)

inverted-F antenna. Such an antenna is useful in combination with a kitchen hob and sensor applications that wirelessly communicate with the kitchen hob, e.g. for improving cooking results.

14 Claims, 3 Drawing Sheets

(51) Int. Cl.
| | |
|---|---|
| H04B 17/23 | (2015.01) |
| G01K 1/024 | (2021.01) |
| F24C 7/08 | (2006.01) |
| H01Q 1/00 | (2006.01) |
| H01Q 1/22 | (2006.01) |
| H04L 29/08 | (2006.01) |
| H04B 17/318 | (2015.01) |
| H05B 6/06 | (2006.01) |
| H05B 6/12 | (2006.01) |

(52) U.S. Cl.
CPC .............. *H01Q 1/22* (2013.01); *H01Q 9/045* (2013.01); *H01Q 9/0421* (2013.01); *H04B 17/318* (2015.01); *H04L 67/12* (2013.01); *H05B 6/062* (2013.01); *H05B 6/1209* (2013.01); *G01K 2207/06* (2013.01)

(56) References Cited

U.S. PATENT DOCUMENTS

| | | | |
|---|---|---|---|
| 8,193,994 B2* | 6/2012 | Alamouti | H01Q 1/007 |
| | | | 343/753 |
| 2003/0132893 A1* | 7/2003 | Forster | B60C 23/04 |
| | | | 343/895 |
| 2007/0210976 A1 | 9/2007 | Luk et al. | |
| 2009/0096553 A1* | 4/2009 | Driesel | G01R 33/34046 |
| | | | 333/219 |

FOREIGN PATENT DOCUMENTS

| | | |
|---|---|---|
| DE | 102009027920 A1 | 1/2011 |
| EP | 1339133 A1 | 8/2003 |
| JP | 2000068736 A | 3/2000 |
| WO | 2004008573 A1 | 1/2004 |
| WO | 2013031518 A1 | 3/2013 |

OTHER PUBLICATIONS

CN OA for application No. 201480060642.9 dated Apr. 17, 2018, 10 pages.

Examination Report issued in corresponding Australian Patent Application No. 2014363835 dated Oct. 25, 2018, 4 pages.

* cited by examiner

ANTENNA ARRANGEMENT AND KITCHEN APPARATUS

BACKGROUND OF THE INVENTION

Recently, automation has been making more and more inroads into household appliances. In kitchen environments, e.g. ovens, dishwashers, microwaves, more or less sophisticated temperature and time control mechanisms have already been established and are known in the art. More recently, the field of sensor applications in kitchen environments has shifted into focus.

The use of sensors in the field of food preparation and recipe control is becoming more and more interesting. In connection with the availability of online recipes and the huge variety of spices, sensors could facilitate the preparation of sophisticated food dishes in various styles for the average consumer. In kitchen environments the presence of high temperatures as well as hot or greasy fluids is the rule. Thus, there arises the problem as to how to provide an easy way of communicating with various sensors and devices.

Meanwhile, due to the presence of mobile applications and Smartphones, the customer is used to all sorts of wireless communication. On the other hand, the market responds to this market situation by providing wireless standards of all sorts and for all kind of applications. Thus, a preferred way of communicating in a household, and particularly in a kitchen environment, is the wireless way.

In this context, however, the need arises to provide technically simple and robust communication solutions. It is thus a prerogative that antennas used for wireless communication in a household should be capable of wideband transmission/reception and of technically simple construction as well as easy to manufacture.

As indicated above, wireless applications are common in the art, and thus antennas of all sorts are also known in the art.

One example is described in EP 1837950 A2. This European patent application is about multi-level and space-filling ground planes for miniature and multi-band antennas. It shows a planar inverted-F antenna (PIFA) in which ground planes of various sorts are possible. A characteristic feature of these ground planes is that they have slits or holes or cut-out structures in them. The disclosed structures are said to control the return loss bandwidth, gain, radiation efficiency and frequency performance. Further, such a ground plane is said to be able to be reduced in comparison to those antennas with solid ground planes.

No further related prior art is known.

The present invention is based on the problem to improve the communication situation in a household environment, and in particular to provide a simple and efficient antenna for household appliances, especially for kitchen appliances.

This problem is solved by an antenna arrangement according to claim 1 and by a kitchen appliance according to claim 14. Further developments of the invention are given in the dependent claims.

BRIEF SUMMARY OF THE INVENTION

Beneficially, the antenna arrangement according to an embodiment of the present invention has a simple construction that by use of a particular feed location and shape provides a resonating antenna body with wideband transmission and reception characteristics. A corresponding antenna may preferably be designed for transmission/reception in frequency ranges of the ISM bands—Industrial, Scientific and Medical Band—, e.g. 433.05-434.79 MHz, 902-928 MHz, 2.4-2.5 GHz. Other frequency ranges are also conceivable.

Advantageously, according to a further development of the antenna arrangement according to the present invention, a curvature is provided on an outer edge of a shape part of the antenna arrangement, providing for wideband characteristics in combination with a more rigid monolithic antenna body.

Beneficially, according to a further development of an embodiment of the antenna arrangement of the present invention, the curvature has an elliptical shape. The elliptical shape optimizes the space that is used for a continuously varying curvature while at the same time providing wideband characteristics for the antenna arrangement. Thus, it allows the optimization of the amount of material that will be used to manufacture the antenna arrangement.

Beneficially, according to a further development of an antenna arrangement according to an embodiment of the present invention, the feed is coaxial, because coaxial cables are commonly used in high-frequency transmission technology and guarantee minimum losses of the signals to be transmitted. Thus, they provide a reliable and widespread technology.

Beneficially, according to a further development of an embodiment of the antenna arrangement according to the present invention, the feeding by coaxial cable takes place on a tongue that is provided inside of a slit of the antenna body, thus allowing for an easy way to manufacture by punching or cutting out the slit and leaving the tongue, while at the same time enabling the particular desired resonating and transmission characteristics of the antenna arrangement.

Favorably, according to a further development of an embodiment of the antenna arrangement according to the present invention, the slit is provided in a longitudinal direction of the antenna arrangement according to the present invention. Beneficially, the longitudinal direction coincides with a middle-/symmetry axis of the antenna arrangement.

Advantageously, the slit between the curvature of the antenna arrangement according to an embodiment of the present invention is provided with parallel edges and extends along the middle of the antenna arrangement, the length of it defined by the desired transmission characteristics. Beneficially the bandwidth of the antenna measured at −5 dB is 25-35 MHz.

Advantageously, according to a further development of an embodiment of the antenna arrangement according to the present invention, it has a flat shape and a ground plane connected to the ground-connecting part of the antenna arrangement. In this manner, beneficially, the antenna arrangement presents itself as a planar inverted-F antenna, which is technically simple and easy to manufacture.

Further advantageously, according to a further development of an embodiment of the antenna arrangement according to the present invention, there is a trapezoidal part provided in connection to the shape part which further improves the resonating and transmission-/reception characteristics in terms of wideband capabilities of the antenna arrangement.

Further beneficially according to a further development of an embodiment of the antenna arrangement according to the present invention, a rectangular part next to the ground-connecting part is provided. This further allows fine tuning of the transmission-/reception characteristics of the antenna arrangement according to the present invention.

Favorably, according to a further development of an embodiment of the antenna arrangement according to the present invention, it is made of sheet metal. Sheet metal is available in various forms in terms of material composition and geometry and thus can be selected from a wide variety on the market. Further, a three-dimensional structure of the antenna arrangement can be formed by firstly punching or cutting out the shape, the slits in the shape part of the antenna arrangement, and then bending it into the desired shape.

Advantageously, an antenna arrangement according to an embodiment of a further development of the present invention has a three-dimensional structure, wherein the ground-connecting part and the shape part are parallel to each other, whereas the rectangular part forms a right angle with both of them in such a manner that there is no overlap between the shape part and the ground-connecting part. This secures a mechanical stable construction by providing the desired wideband antenna characteristics.

Advantageously, an antenna arrangement according to a further development of the present invention is realized in the form of a planar inverted-F antenna with an elliptically tapered resonating metallic plate. Such an antenna arrangement is optimally adapted to a desired use, facilitating communication in a household-, in particular kitchen environment, while at the same time being technically robust, mechanically stable and relatively easy to manufacture.

Advantageously, a kitchen appliance according to an embodiment of the present invention comprises an antenna arrangement according to any embodiment of the present invention. Such a combination provides an optimum solution to facilitate wireless communication in a household environment and in particular improves the cooking experience of a customer when used in combination with a hob and a sensor. Thereby giving an average customer a more flexible approach to cooking and better control for achieving successful results.

Further beneficially, a kitchen appliance according to an embodiment of the present invention comprises a wireless device that is adapted to communicate with the antenna arrangement according to the present invention. Such a combination provides a minimum configuration of an appliance and the device in a household environment and can be optimally adapted to its desired purpose.

BRIEF DESCRIPTION OF THE DRAWINGS

Subsequently, embodiments of the invention will further be explained on the basis of examples shown in the drawings wherein.

DETAILED DESCRIPTION

Figure 1:
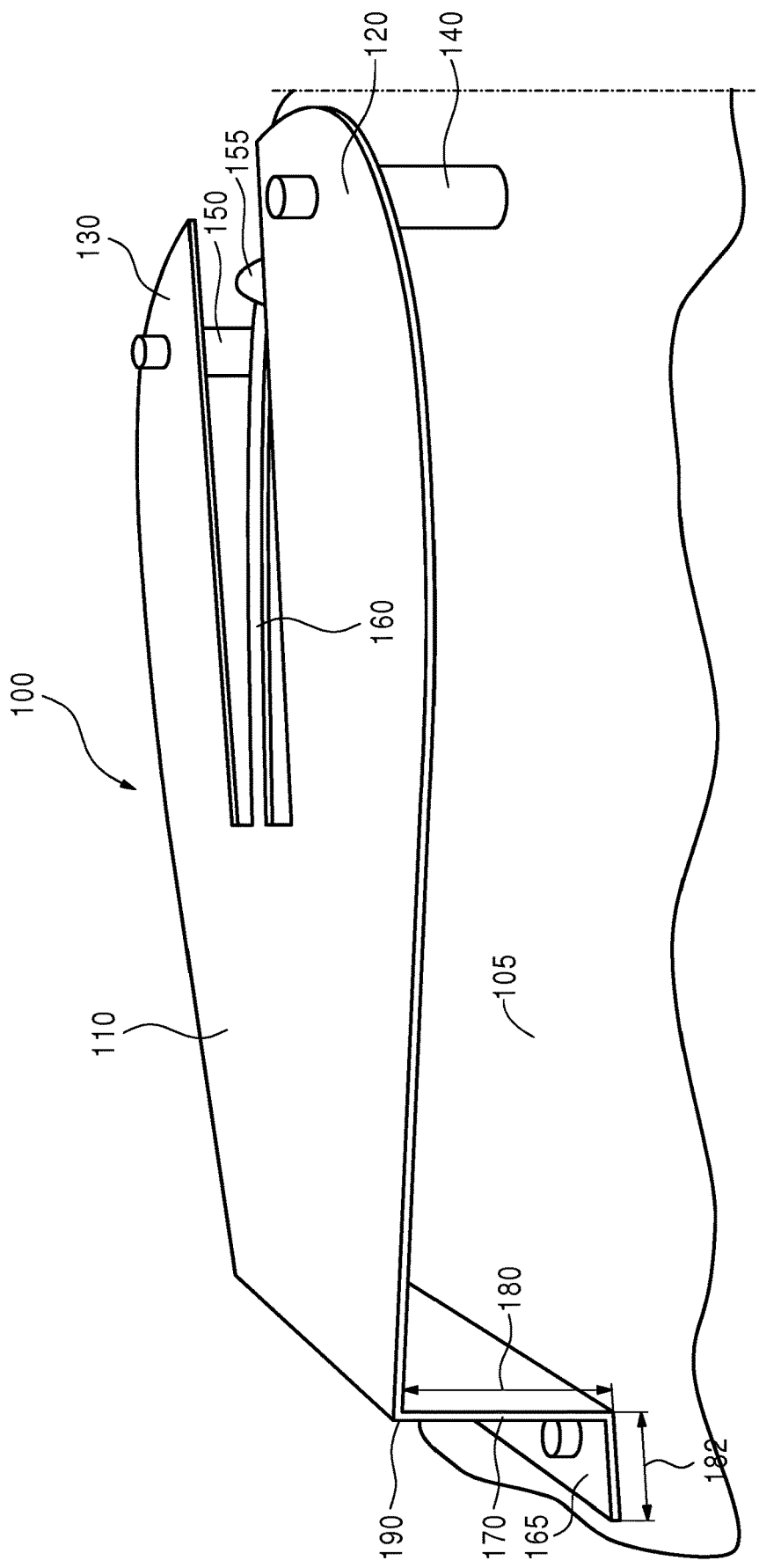
FIG. 1 shows a side view of a preferred embodiment of an antenna arrangement.

As shown in FIG. 1, an antenna arrangement 100 comprises a shape part consisting of the left shape 130 and the right shape 120.

At its widest part, here the antenna arrangement 100 measures preferably about 100 mm, more preferably 102 mm and most preferably 101.5 mm.

The shaped parts have a curvature which is more closely shown in the following FIG. 2. The left and the right shaped part 130 and 120 are separated by a slit that comprises a tongue 160, which is connected to a coaxial feeding 155. Preferably the slit has an overall width of about 20 mm, more preferably 24 mm and most preferably 23 mm. The tongue 160 beneficially serves to further adapt the transmission characteristics of the antenna arrangement 100. Therefore in different embodiments of the antenna arrangement 100 the tongue 160 may have different proportions.

In one embodiment with a shorter antenna body the tongue 160 ends inside the slit. The overall length of an antenna body according to this embodiment is about 160 mm, more preferably 156 mm, and most preferably 158.5 mm. Correspondingly the length of the resonating part is about 145 mm, more preferably 141 mm, and most preferably 143.5 mm. Beneficially the tongue 160 has a length of about 60 mm, more preferably 64 mm, and most preferably 62 mm. Preferably from its exterior end inward the tongue comprises a step reaching downward towards the ground plane 105. Preferably this step is used to attach a connector for the coaxial feeding. Beneficially it goes downward from the level of the tongue 160 about 5 mm, preferably 5.5 mm, has a length of about 8 mm, preferably 8.5 mm and conforms to the width of the tongue 160. On the other hand the length of the tongue of this embodiment without the step is thus about 51.5 mm, more preferably 55.5 mm, and most preferably 53.5 mm. At this location, in between the left 130 and the right 120 shaped parts, the feeding by means of a coaxial cable is beneficially provided according to this preferred embodiment. The left shaped part 130 is beneficially supported by an isolated spacer 150 and the right shaped part 120 is beneficially supported by an isolated spacer 140. The distance between the ground plane 105 and resonating structure is about about 14 mm, more preferably 10 mm, and most preferably 12 mm.

In another embodiment with a longer antenna body the tongue 160 ends outside the slit. The overall length of an antenna body according to this embodiment is about 173 mm, more preferably 169 mm, and most preferably 171.5 mm. Correspondingly the length of the resonating part is about 158 mm, more preferably 154 mm, and most preferably 156.5 mm. Beneficially the tongue 160 here has a length of about 86.5 mm, more preferably 90.5 mm, and most preferably 88.5 mm. Preferably from its exterior end inward the tongue comprises a step reaching downward towards the ground plane 105. Preferably this step is used to attach a connector for the coaxial feeding. Beneficially it goes downward from the level of the tongue 160 about 5 mm, preferably 5.5 mm, has a length of about 8 mm, preferably 8.5 mm and conforms to the width of the tongue 160. On the other hand the length of the tongue of this embodiment without the step is thus about 78 mm, more preferably 82 mm, and most preferably 80 mm.

Further, a trapezoidal shape 110 can be identified which extends from the end of the slit to the step at the rectangular part 170 next to the left end of the antenna arrangement 100. Beneficially in both embodiments the trapezoidal shape 110 has a length of about 64.8 mm, more preferably 88.8 mm, and most preferably 66.8 mm.

Also, a ground plane 105 can be identified. Next to the ground plane, there is a ground connecting part 165 and a rectangular part 170. The rectangular part has a height 190 and the ground-connecting part has a width 182.

Beneficially the width 182 is about 13 mm, more preferably 17 mm, and most preferably 15 mm.

Beneficially the height 190 is about 10 mm, more preferably 14 mm, and most preferably 12 mm.

As depicted the trapezoidal shape 110 ends at the bend 190 into the rectangular part 170.

Figure 2:
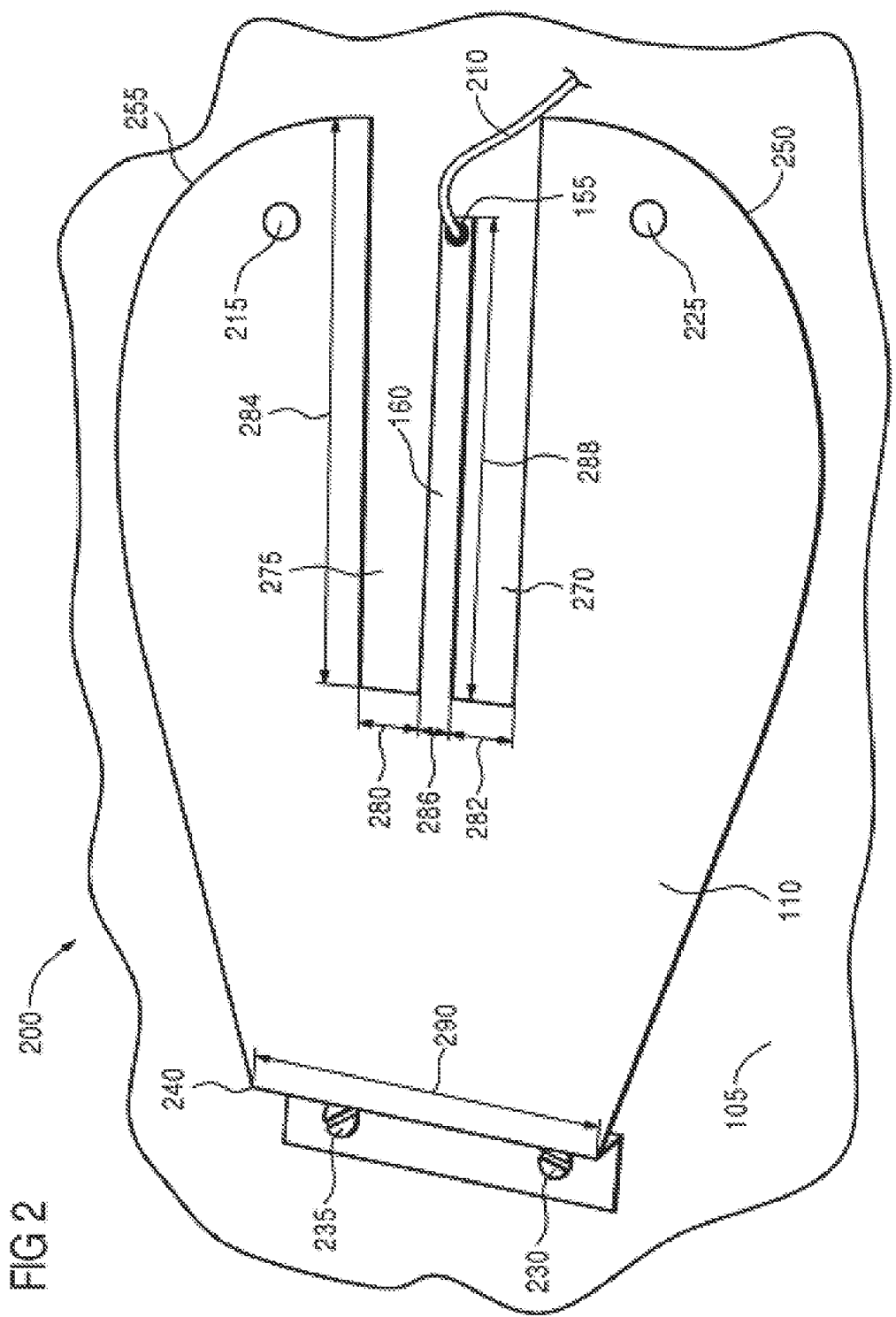
FIG. 2 shows a top view of a preferred embodiment of an antenna arrangement according to the present invention.

FIG. 2 shows a top view 200 of an embodiment of an antenna arrangement according to the present invention which e.g. substantially resembles a heart shape. Here, also a ground plane 105 can be seen which is underneath the shape part. Further, FIG. 2 depicts top ends of the isolating spacers 225 and 215 respectively mechanically connecting the right shaped part 120 and the left shaped part 130 with the ground plane 105. Furthermore, the left shaped part 130 has a curvature 255 and the right shaped part 120 has a curvature 250. Beneficially, this curvature is implemented as the section of an ellipse. It my conform to a radius of about 48.75 mm, preferably 52.75 mm, most preferably to 50.75 mm. The ellipse provides a good variation regarding the change of the width of a resonating part of the antenna arrangement and thus allows for wideband transmission and reception characteristics.

Moreover, a trapezoidal shape 110 is shown in the drawing. As can be seen, the ground-connecting part 165 is fixed by its screws 230 and 235, respectively, to the ground plane 105. At its left end, the antenna arrangement at the bend 190 has a suitable width 290 in terms of desired transmission-/reception characteristics.

Beneficially the width 290 is about 52 mm, more preferably 56 mm, and most preferably 54 mm.

Favorably the width of the ground connecting part 165 corresponds to the width 290 of the bend. It may be smaller though about 32 mm, more preferably 36 mm, and most preferably 34 mm.

Further, it can be seen that the feeding 155 is provided by a coaxial cable 210 at the tongue 160. The slit of the antenna arrangement can be provided in the form of a left slit 275 and a right slit 270. However, these two slits can be seen as one slit that is separated by the tongue 160 as well. Preferably, the slit has a length 284 about 74.7 mm, more preferably 78.7 mm, and most preferably 76.7 mm in the embodiment of the shorter antenna arrangement.

Favorably, the slit has a length 284 about 78 mm, more preferably 82 mm, and most preferably 80 mm in the embodiment of the longer antenna arrangement and a width 280, respectively 282, which can be different for the left slit 275 and the right slit 270. Together beneficially the left width 280 plus the right width 282 is about 21 mm, more preferably 25 mm, and most preferably 23 mm. Preferably, the width 286 of the tongue is adapted to the transmission frequencies and measures about 3.8 mm, more preferably 5.8 mm, and most preferably 4.8 mm, Thus generally about 5 mm.

To summarize, the antenna arrangement according to the preferred embodiment of the present invention is technically simple, easy to manufacture and provides wideband characteristics.

A corresponding antenna my preferably be designed for transmission/reception in frequency ranges of the ISM bands—Industrial, Scientific and Medical Band—, e.g. 433.05-434.79 MHz, 902-928 MHz, 2.4-2.5 GHz. Other frequency ranges are also conceivable.

Also in terms of its dimension, it can be easily used in combination with a household appliance, especially a kitchen appliance such as a hob to communicate with a sensor that is used in combination with the household appliance, respectively the kitchen hob. The e.g. elliptically tapered resonating metallic plate consisting of the left shaped part 130, the right shaped part 120 and the trapezoidal shaped part 110 allows the increase of the antenna bandwidth of the antenna arrangement according to the present invention and thus permits communication between e.g. a hob and the wireless sensor.

Figure 3:
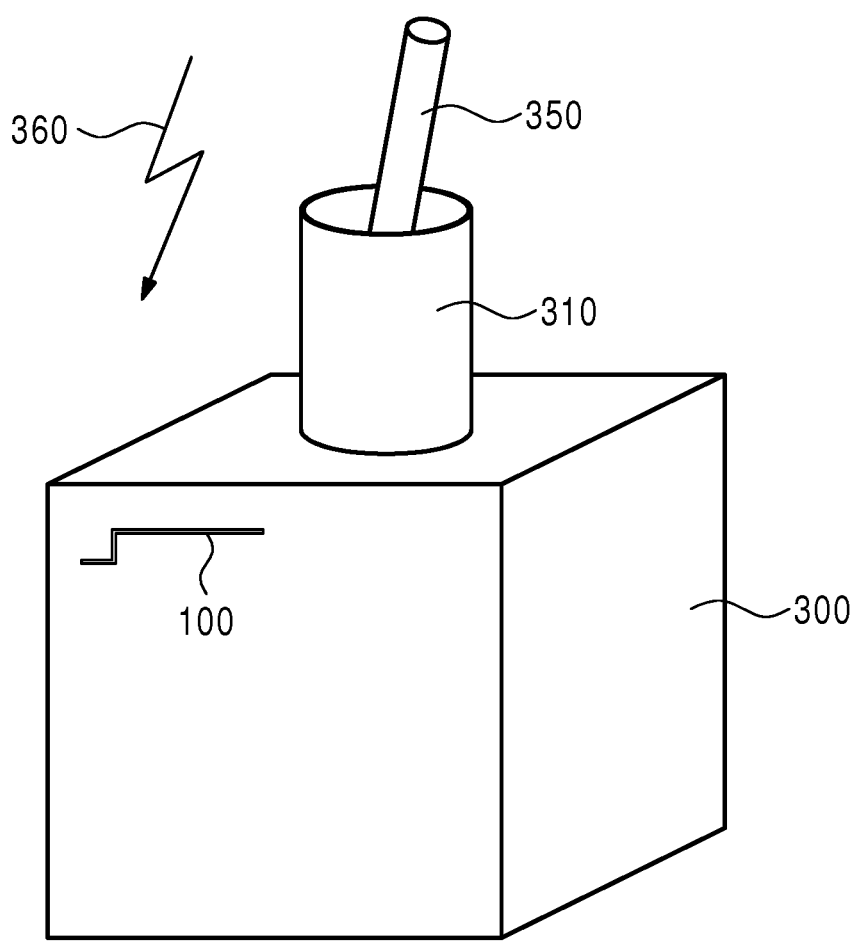
FIG. 3 shows a kitchen appliance.

As FIG. 3 shows, a kitchen apparatus 300 according to an embodiment of the present invention has an antenna arrangement 100, a cooking vessel 310. Further beneficially it is completed by a cooking sensor 350 that is capable of wirelessly 360 communicating with the antenna arrangement 100 according to embodiments of the present invention. This beneficially provides for a minimum configuration to adapt a sensor application in a kitchen environment and in particular to use sensors to improve cooking results and to control cooking results by an average customer.

LIST OF REFERENCE NUMERALS 100 side view of antenna arrangement
130 left shaped part
120 right shaped part
155 feeding
150 left isolating spacer
140 right isolating spacer
160 tongue
110 trapezoidal part
165 ground connecting part
170 rectangular part
105 ground plane
200 top view of antenna arrangement
255 left curvature
250 right curvature
215 top of isolating spacer
225 top of isolating spacer
210 coaxial feeding cable
270 right slit
275 left slit
284 length of slit
288 length of tongue
286 width of tongue
280 width of left slit
282 width of right slit
230,235 screws at ground-connecting part to connect with ground plane 105
240 left end of shape part
290 width of left end of shape part
300 kitchen apparatus
310 cooking vessel
350 sensor
360 wireless communication

The invention claimed is:

1. Antenna arrangement comprising:
   a ground-connecting part at one end;
   a shape part distal from the ground-connecting part with a curvature, the curvature having a heart shape;
   a slit in the curvature; and
   a feed located within the slit,
wherein the shape part has a trapezoidal part next to the curvature, the trapezoidal part extending from an end of the slit.

2. Antenna arrangement according to claim 1, wherein the curvature is located at an outer edge of the shape part.

3. Antenna arrangement according to claim 1, wherein the feed is coaxial.

4. Antenna arrangement according to claim 1, wherein the feed is connected on a tongue in the slit.

5. Antenna arrangement according to claim 1, wherein the slit extends in a longitudinal direction of the antenna arrangement.

6. Antenna arrangement according to claim 1, wherein the slit has parallel edges and/or is located in the middle of the shape part.

7. Antenna arrangement according to claim 1, having a flat shape and/or a ground plane connected to the ground-connecting part.

8. Antenna arrangement according to claim 7, wherein the shape part comprises a left shaped part section and a right shaped part section, each of said left shaped part section and said right shaped part section being supported on the ground plane by an isolated spacer.

9. Antenna arrangement according to claim 1, having a rectangular part next to the ground-connecting part.

10. Antenna arrangement according to claim 1, said antenna arrangement being manufactured of sheet metal.

11. Antenna arrangement according to claim 10, said antenna arrangement having a stepped shape wherein the ground-connecting part is parallel to the shape part and a rectangular part forms a right angle with both.

12. Antenna arrangement according to claim 1, said antenna arrangement being arranged as a planar inverted-F antenna with elliptically tapered resonating metallic plate.

13. A kitchen appliance comprising the antenna arrangement according to claim 1.

14. The kitchen appliance according to claim 13, comprising a wireless device adapted to communicate with the antenna arrangement.

* * * * *